3,257,432
ETHERS OF 3β,16β-ANDROSTENDIOLS
Max N. Huffman, Omaha, Nebr., assignor to Lasdon Foundation, Inc., New York, N.Y., a corporation of New York
No Drawing. Original application Nov. 26, 1963, Ser. No. 326,238. Divided and this application Aug. 23, 1965, Ser. No. 482,333
7 Claims. (Cl. 260—397.5)

This application is a division of my copending application Serial No. 326,238, filed November 26, 1963.

This application relates to ethers of 3β,16β-androstandiol having lower hydrocarbon radicals in the 16α-position and to ethers of 5-androsten-3β,16β-diol having lower hydrocarbon radicals in the 16α-position. More particularly, this invention relates to 5-androstene compounds of the general formula

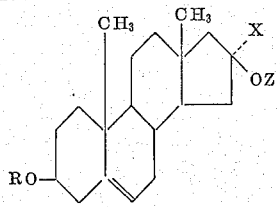

and androstane compounds of the general formula

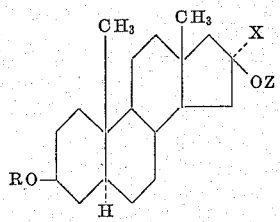

wherein R is a lower hydrocarbon radical containing 1 to 5 carbon atoms, X is a lower hydrocarbon radical containing 1 to 5 carbon atoms and Z is a member of the group consisting of hydrogen and lower alkanoyl radicals containing 1 to 5 carbon atoms.

The compounds of the foregoing type are valuable fungistatic agents. They exhibit powerful fungistatic effects against *Histoplasma capsulatum*, a mold which is pathogenic to humans and is the causative agent of the systemic fungal infection known as histoplasmosis. Histoplasmosis occurs in two forms, the benign and the severe, the latter usually proving fatal to the human. Certain of the compounds which constitute this invention inhibit the growth of *Histoplasma capsulatum* in dilutions of one part per million. The compounds described herein have low toxicities for humans and higher animals and can be administered by mouth.

In the compounds of the foregoing types, R and X represent the same or different lower hydrocarbon radicals, such as alkyl radicals including methyl, ethyl, propyl, butyl and amyl radicals as well as alkenyl radicals such as vinyl, allyl, methally and crotyl radicals and alkynyl radicals such as ethynyl, methylethnyl and proparagyl radicals. Z can represent hydrogen or it can represent a lower alkanoyl radical such as acetyl, propionyl, butyryl and pentanoyl.

The 5-androstene compounds which comprise this invention can be produced from ethers of 5-androsten-3β-ol-16-one by reaction with a Grignard reagent of the formula XMg-halogen wherein X has the meaning given hereinabove. The Grignard reaction is carried out in an anhydrous solvent such as anhydrous ether, at a temperature in the range from 0° to 100° C., usually with an excess of Grignard reagent. The resulting steroid containing a hydrocarbon substituent in the 16α-position and a hydroxyl radical in the 16β-position can be isolated by decomposition of the organometallic compound with dilute acid or ammonium chloride solution and by extraction with an immiscible organic solvent such as ether or chloroform, from which the steroid can be isolated by evaporation.

The 16β-hydroxyl radicals can be esterified by treatment with an alkanoyl halide in an inert solvent such as chloroform containing a small amount of pyridine or dimethylaniline. The esterification reaction is carried out under conventional esterification conditions, usually at room temperature with an excess of the alkanoyl halide.

The androstane compounds which comprise this invention can be produced from the corresponding 5-androstene compounds by hydrogenation of the 5,6 double bond thereof. The hydrogenation is conveniently carried out at low pressure, such as 10–50 p.s.i.g., at low temperature (20–50° C.), with an excess of hydrogen in the presence of a hydrogenation catalyst, preferably a noble metal catalyst such as palladium supported on charcoal. The 16β-hydroxyl radical of these androstane compounds can be esterified as described hereinabove.

The compounds of this invention having alkynyl groups in the 16α-position can be produced from ethers of 3β-hydroxy-16-keto-5-androstenes and 3β-hydroxy-16-keto-androstanes by reaction with alkali metal acetylides in solvents such as t-butyl alcohol, t-amyl alcohol, liquid ammonia and formamide. The alkali metal acetylides have the general formula

M—C≡C—R' wherein M is an alkali metal and R' is a hydrogen or hydrocarbon radical containing 1 to 3 carbon atoms. The alkali metal acetylides react with the 16-keto substituent to produce a 16α-alkynyl-16β-ol structure. The reaction of the alkali metal acetylides with the 16-keto steroids of the type described above is conveniently carried out at a low temperature in the range of —35° to 100° C. with an excess of the alkali metal acetylide. After the reaction is completed, over a period of 1 to 24 hours, the reaction mixture is decomposed carefully with water which destroys the potassium salt and releases the ether of the 3β-hydroxy-5-androsten-16α-alkynyl-16β-ol or the ether of the 3β-hydroxyandrostan-16α-alkynyl-16β-ol. The latter can be removed from the reaction mixture by extraction with an organic solvent such as ether and isolated from the extract by the conventional procedures.

It is an object of this invention to provide new and useful 5-androstene and androstane ethers, and methods of producing them. It is another object to provide 3-ethers of 5-androsten-3β,16β-diol compounds having hydrocarbon substituents in the 16α-position and 3-ethers and androstan-3β,16β-diol compounds having hydrocarbon substituents in the 16α-position, which compounds have value in medicine as fungistatic agents.

The invention is disclosed in further detail by means of the following examples which are provided for purposes of illustration only and are not to be construed as limiting the invention in scope. It will be understood by those skilled in the art that various modifications in reagents, operating conditions and equivalent materials can be made without departing from this invention.

EXAMPLE 1

*3β-methoxy-5-androsten-16α-methyl-16β-ol*

To a solution of 1.08 grams of 3β-methoxy-5-androsten-16-one in 100 ml. of absolute ether was added a solution of 25 ml. of 3 molar methylmagnesium bromide solution in ether. The combined solution was refluxed for 1 hour, cooled and decomposed with 100 ml. of cold 1.0 N hydrochloric acid. The ether phase was separated and the aqueous phase was washed with ether. The combined ether extracts were washed with ice water and evaporated, forming a residue of 3β-methoxy-5-androsten-16α-methyl-16β-ol. The latter was recrystallized from 80% methanol and melted at 142–142.5° C. It had a rotation of $[\alpha]_D^{25.5°} = 32°$ (c.=1.049 in chloroform).

EXAMPLE 2

*3β-methoxy-16α-ethyl-5-androsten-16β-ol*

A solution of 3.5 grams of 3β-methoxy-5-androsten-16-one in 350 ml. of anhydrous ether was treated with 70 ml. of 3.0 molar ethylmagnesium bromide solution in anhydrous ether over a period of 30 minutes at reflux temperature. Refluxing was continued for 3 hours longer, then the mixture was cooled and decomposed with a solution of 35 grams of ammonium chloride in 150 ml. of water. 1000 ml. of ether was added and the ether phase separated and washed with ice water. On evaporation of the ether, a residue of 3β-methoxy-16α-ethyl-5-androsten-16β-ol was obtained. After recrystallization from 80% methanol, it melted at 149–150° C.

EXAMPLE 3

*3β-methoxy-16α-allyl-5-androsten-16β-ol*

To an allylmagnesium bromide solution prepared from 8.1 grams of magnesium, 100 ml. of dry ether and a solution of 29 ml. of allyl bromide in 300 ml. of dry ether was added a solution of 4.5 grams of 3β-methoxy-5-androsten-16-one in 500 ml. of anhydrous ether. The addition was carried out at such a rate as to maintain the temperature of the reaction mixture at 0–2° C. with external cooling. After the addition was completed, stirring was continued for 2.5 hours and the reaction mixture left overnight to warm gradually to room temperature. The reaction mixture was cooled with ice and decomposed with 600 ml. of 2.5 N ammonium chloride solution. The reaction mixture was decanted through glass wool and 1 liter of ether added thereto. The ether phase was separated, washed with ice water and evaporated, leaving a residue of 3β-methoxy-16α-allyl-5-androsten-16β-ol. The latter was recrystallized from 85% methanol and melted at 116–117° C.

EXAMPLE 4

*3β-methoxy-16α-ethynyl-5-androsten-16β-ol*

A solution of 8.0 grams of potassium in 200 ml. of tertiary-butyl alcohol was cooled to 0° C., flushed with nitrogen and then saturated with acetylene by passage of acetylene through the solution for a period of 1 hour. To this solution was added a solution of 7.6 grams of 3β-methoxy-5-androsten-16-one in 100 ml. of ethylene glycol dimethyl ether, acetylene being bubbled through the reaction mixture with good agitation at 0° for 18 hours. The mixture was then decomposed with 600 ml. of ice water with good stirring over a period of thirty minutes and the resulting mixture was poured into 2.5 liters of cold saturated sodium chloride solution. 250 ml. of ice water containing 25 ml. of hydrochloric acid was added and the resulting mixture cooled to 0° C. and filtered. The precipitate of 3β-methoxy-16α-ethynyl-5-androsten-16β-ol was dissolved in 333 ml. of n-propyl alcohol to which was added a solution of 8 grams of carbomethoxylamine hemihydrate and 12 grams of anhydrous potassium acetate in 133 ml. of water. The resulting solution was heated to reflux for 2 hours, chilled to 0° C., diluted with 2 liters of ether and the ether phase was separated and washed with five 200-ml. portions of 0.5 N sodium hydroxide solution, then with five 500-ml. portions of ice water. The ether solution was dried and evaporated, leaving a residual solution of 3β-methoxy-16α-ethynyl-5-androsten-16β-ol in n-propyl alcohol. The latter was evaporated in vacuo, leaving a residue of steroid which was dissolved in 200 ml. of acetone and the latter solution was evaporated to 100 ml. volume. To the resulting solution was added 100 ml. of petroleum ether and the mixture evaporated to remove acetone. The procedure was repeated several times leading to crystalline 3β-methoxy-16α-ethynyl-5-androsten-16β-ol of M.P. 190–191° C. with sintering from 189.5° C.

EXAMPLE 5

*3β-ethoxy-16α-methyl-5-androsten-16β-ol*

To a refluxing solution of 10 grams of 3β-ethoxy-5-androsten-16-one in 1 liter of anhydrous ether was added 150 ml. of 3 molar methylmagnesium bromide solution in anhydrous ether. The refluxing was continued for 75 minutes longer, than the reaction was chilled in an ice bath and decomposed with 700 ml. of 1.0 N hydrochloric acid solution. 1500 ml. of ether was added and the ether layer was separated, washed with ice water and evaporated. The residue of 3β-ethoxy-16α-methyl-5-androsten-16β-ol was recrystallized from 70% methanol and washed with petroleum ether. It melted at 90–90.5° C.

EXAMPLE 6

*3β-ethoxy-16α-ethyl-5-androsten-16β-ol*

To a solution of 10.0 grams of 3β-ethoxy-5-androsten-16-one in 1000 ml. of anhydrous ether was added 150 ml. of 3.0 molar ethylmagnesium bromide in anhydrous ether while the mixture was maintained at reflux temperature. After the addition was completed, refluxing was continued for 1½ hours. The mixture was cooled in an ice bath and decomposed by the slow addition of 700 ml. of 1.0 N hydrochloric acid solution. 1500 ml. of ether was added and the ether phase was separated, washed with ice water and evaporated. The residue of 3β-ethoxy-16α-ethyl-5-androsten-16β-ol was recrystallized from 80% methanol; M.P. 98.5–99° C. with sintering from 97.5° C.

EXAMPLE 7

*3β-ethoxy-16α-n-propyl-5-androsten-16β-ol*

To a solution of n-propylmagnesium bromide prepared from 14.6 grams of magnesium turnings, 50 ml. of anhydrous ether and a solution of 54.8 ml. of n-propyl bromide in 350 ml. of anhydrous ether was added a solution of 10.0 grams of 3β-ethoxy-5-androsten-16-one in 500 ml. of anhydrous ether. The addition was carried out over 15 minutes while the mixture was heated to reflux temperature. Refluxing was continued for 75 minutes and then the solution was chilled in ice and decomposed slowly with 1 liter of 1.0 N hydrochloric acid solution. 1.5 liters of ether was added and the ether phase was separated, washed with ice water and evaporated. The residue of 3β-ethoxy-16α-n-propyl-5-androsten-16β-ol was recrystallized from 90% methanol, washed with petroleum ether and dried. It melted at 91.5° C. with sintering at 90.5° C.

EXAMPLE 8

*3β-ethoxy-16α-allyl-5-androsten-16β-ol*

A solution of allylmagnesium bromide was prepared from 43.7 ml. of allyl bromide, 1000 ml. of anhydrous ether and 12.2 grams of magnesium turnings. To the allylmagnesium bromide solution was added a solution of 3β-ethoxy-5-androsten-16-one in 500 ml. of anhydrous ether over a period of 1 hour with good stirring, the temperature being maintained at 0–2° C. Stirring was continued for 3 hours longer, then the reaction mixture allowed to warm gradually to room temperature overnight. The reaction mixture was then chilled in an ice bath and decomposed by the slow addition of a solution of 30 grams of ammonium chloride in 500 ml. of ice water containing sufficient hydrochloric acid to render the solution acid to litmus. 800 ml. of ether was added and the resulting mixture was partitioned. The ether phase was washed with ice water, dried and evaporated. The residue of 3β-ethoxy-16α-allyl-5-androsten-16β-ol was dissolved in acetone, treated with activated carbon, filtered and diluted with petroleum ether and evaporated. The product was recrystallized from 80% methanol and melted at 62.5–63° C. with sintering from 61° C.

By the same procedure with an equivalent quantity of crotylmagnesium bromide in lieu of allylmagnesium bromide there is produced 3β-ethoxy-16α-crotyl-5-androsten-16β-ol.

EXAMPLE 9

3β-ethoxy-16α-ethynyl-5-androsten-16β-ol 250 ml. of a solution of potassium tertiary-butoxide in t-butyl alcohol (4.0 grams of potassium per 100 ml.) was chilled to 0° C. and saturated with acetylene for 1 hour. The solution was stirred and a solution of 10.0 g. of 3β-ethoxy-5-androsten-16-one in 125 ml. of ethylene glycol dimethyl ether was added, acetylene being passed through the mixture continously for 7 hours at 0° C. Then 600 ml. of ice water was added gradually with stirring and the resulting mixture was poured into 2.5 liters of ice cold saturated sodium chloride solution containing 30 ml. of hydrochloric acid. The mixture was cooled to 0° C. The precipitate of 3β-ethoxy-16α-ethynyl-5-androsten-16β-ol was dissolved in 333 ml. of n-propyl alcohol, to which was added a solution of 8 grams of carbomethoxylamine hemihydrochloride and 12 grams of anhydrous potassium acetate in 133 ml. of water. The solution thus formed was heated at reflux for 2.5 hours, cooled and extracted with 2.5 liters of ether. The ether phase was washed 5 times with 200-ml. portions of 0.4 N sodium hydroxide solution and then with water. The ether was evaporated and the residual n-propyl alcohol solution was diluted with 1 liter of cold saturated sodium chloride solution. The precipitate of 3β-ethoxy-16α-ethynyl-5-androsten-16β-ol which formed was separated, washed with water and dried. The steroid was dissolved in 25 ml. of acetone, and then 25 ml. of heptane was added. The mixture was heated to displace the acetone and the residue was cooled to room temperature. Crystals of 3β-ethoxy-16α-ethynyl-5-androsten-16β-ol were obtained which melted at 163–165° C. with sintering from 162° C.

When an equivalent amount of potassium ethylacetylide in t-butyl alcohol is used in place of the potassium acetylide in t-butyl alcohol, there is produced 3β-ethoxy-16α-ethylethynyl-5-androsten-16β-ol.

EXAMPLE 10

3β-propoxy-16α-methyl-5-androsten-16β-ol

To a solution of 5.0 grams of 3β-propoxy-5-androsten-16-one in 500 ml. of anhydrous ether was added 75 ml. of 3 molar methylmagnesium bromide solution in anhydrous ether. The mixture was refluxed for 1½ hours, then cooled and decomposed with 300 ml. of cold 1.0 N hydrochloric acid solution. 500 ml. of ether was added and the ether phase was separated. The aqueous phase was washed with 500 ml. of ether and the combined ether extracts were washed with ice water, dried and evaporated. The residue of 3β-propoxy-16α-methyl-5-androsten-16β-ol was recrystallized from 75% methanol and melted at 104–104.5° C. with sintering from 103° C.

EXAMPLE 11

3β-propoxy-16α-ethyl-5-androsten-16β-ol

To a solution of 6.0 grams of 3β-propoxy-5-androsten-16-one in 600 ml. of dry ether was added 90 ml. of 3.0 molar ethylmagnesium bromide solution in ether over a period of 30 minutes. The mixture was refluxed throughout the addition and for 2 hours longer. It was then cooled in an ice bath and decomposed by the slow addition of 30 grams of ammonium chloride in 40 ml. of hydrochloric acid. 600 ml. of ether was added, the mixture was agitated and separated and the ether extract was removed, washed with ice water and evaporated. The residue of 3β-propoxy-16α-ethyl-5-androsten-16β-ol was recrystallized from 90% methanol and washed with petroleum ether. It melted at 81.5–82° C. with sintering from 80.5° C.

By substitution of an equivalent amount of n-amylmagnesium bromide for the ethylmagnesium bromide in the foregoing procedure, there is obtained 3β-propoxy-16α-n-amyl-5-androsten-16β-ol.

EXAMPLE 12

3β-propoxy-16α-n-propyl-5-androsten-16β-ol

A solution of propylmagnesium bromide was prepared from 6.1 grams of magnesium turnings, 100 ml. of anhydrous ether and a solution of 23 ml. of n-propyl bromide in 250 ml. of anhydrous ether. The propylmagnesium bromide solution was heated to reflux and a solution of 4.0 grams of 3β-propoxy-5-androsten-16-one in 200 ml. of anhydrous ether was added slowly over 30 minutes while maintaining refluxing temperature. After the addition was completed, the mixture was refluxed and stirred for 1½ hours. It was then cooled in an ice bath and decomposed cautiously with 800 ml. of 2.0 N ammonium chloride solution. 800 ml. of ether was added and the mixture agitated. The ether was then separated, washed with ice water and evaporated. The precipitate of 3β-propoxy-16α-n-propyl-5-androsten - 16β-ol was recrystallized from 95% methanol and from petroleum ether. It melted at 110.5–111° C. with sintering from 110° C.

EXAMPLE 13

3β-propoxy-16α-allyl-5-androsten-16β-ol

A solution of allylmagnesium bromide was prepared from 6.1 grams of magnesium turnings, 250 ml. of anhydrous ether and a solution of 22 ml. of allyl bromide in 250 ml. of anhydrous ether. The solution was maintained at a temperature below 2° C. and to it was added, over a period of 1 hour, a solution of 4.0 grams of 3β-propoxy-5-androsten-16-one in 250 ml. of anhydrous ether. The mixture was then agitated for 3 hours at a temperature from 0° to 2° C. and allowed to rise to room temperature over a period of 15 hours. It was then chilled in ice water and decomposed with 750 ml. of 2.5 N ammonium chloride solution. 500 ml. of ether was added, the mixture was agitated and the ether phase was separated, washed with water, dried and evaporated. The residue was recrystallized from 90% methanol and from petroleum ether, providing 3β-propoxy-16α-allyl-5-androstan-16β-ol which melted at 85–86° C.

500 ml. of 3β-propoxy-16α-allyl-5-androsten-16β-ol was acetylated in 25 ml. of chloroform and 10 ml. of dimethylaniline with 5 ml. of acetyl chloride. The chloroform was removed by evaporation and the residue was fractionated between ether and dilute hydrochloric acid. The ether extract was evaporated and the residue of 3β-propoxy-16α-allyl-5-androsten-16β-ol acetate was recrystallized from 80% methanol.

EXAMPLE 14

3β-allyloxy-16α-methyl-5-androsten-16β-ol

A solution of 10.0 grams of 5-androsten-3β-ol 16-one hemihydrate in 120 ml. of anhydrous pyridine was treated with 20.0 grams of p-toluenesulfonyl chloride at ice temperature for 1 hour. The reaction mixture was left at room temperature for a day. It was then diluted with 2.5 liters of ice water containing 7.0 grams of potassium bicarbonate. The precipitate of 5-androsten-3β-ol-16-one p-toluenesulfonate was separated, washed and dried. It was dissolved in 250 ml. of allyl alcohol and the resulting solution refluxed for 2.5 hours. Then 150 ml. of water was added and the resulting solution evaporated to 150 ml. volume. Upon chilling to 0° C., a precipitate of 3β-allyloxy-5-androsten-16-one was obtained. It was recrystallized from 95% ethanol and from methanol. The purified product thus formed melted at 80.5–82.5° C.

4.23 grams of 3β-allyloxy-5-androsten-16-one was dissolved in 400 ml. of anhydrous ether and to the resulting solution was added slowly 85 ml. of 3.0 molar methylmagnesium bromide solution in anhydrous ether. The mixture was refluxed for 2½ hours with agitation, then cooled to about 0° C. and decomposed slowly with a solution of 40 grams of ammonium chloride in 200 ml. of water. 800 ml. of ether was added, the mixture was agitated and the ether layer was separated, washed with ice water, dried and evaporated. The residue of 3β-allyloxy-16α-methyl - 5 - androsten-16β - ol was recrystallized from 80% acetone and melted at 96–97° C.

EXAMPLE 15

3β-allyloxy-16α-n-propyl-5-androsten-16β-ol

A solution of n-propylmagnesium bromide was prepared from 8.1 grams of magnesium turnings, 75 ml. of anhydrous ether and a solution of 31 ml. of n-propyl bromide in 300 ml. of anhydrous ether. The solution was heated to reflux and there was added thereto a solution of 4.0 grams of 3β-allyloxy-5-androsten-16-one in 1200 ml. of anhydrous ether over a period of about 30 minutes. Reflux was continued for 2 hours longer; then the reaction mixture was chilled in ice water and decomposed with 500 ml. of a 2.0 N ammonium chloride solution. The ether phase was separated and the aqueous phase was extracted with one liter of ether. The combined ether extracts were washed with water and evaporated. The residue of 3β-allyloxy-16α-n-propyl-5-androsten-16β-ol was recrystallized from 90% methanol and from 90% acetone. It melted at 102.5–103° C. with sintering from 101.5° C.

By use of an equivalent quantity of allylmagnesium bromide in place of the n-propylmagnesium bromide in the foregoing procedure, there is produced 3β-allyloxy-16α-allyl-5-androsten-16β-ol.

EXAMPLE 16

3β-methoxy-16α-methyl-5-androsten-16β-ol acetate

To a solution of 600 milligrams of 3β-methoxy-16α-methyl-5-androsten-16β-ol in 30 ml. of dry chloroform was added a solution of 12 ml. of dimethylaniline containing 6 ml. of acetyl chloride. The mixture was left at room temperature for 20 hours; then the chloroform and excess acetyl chloride were removed by distillation. The residue was partitioned between 450 ml. of ether and 350 ml. of dilute (1:5) hydrochloric acid. The ether extract was washed with ice water and evaporated. The residue of 3β-methoxy-16α-methyl-5-androsten-16β-ol acetate was recrystallized from 70% methanol; M.P. 92.5–93° C.

When an equivalent amount of butyryl chloride is used in lieu of the acetyl chloride in the foregoing procedure, there is obtained 3β-methoxy-16α-methyl-5-androsten-16β-ol butyrate.

EXAMPLE 17

3β-ethoxy-16α-methyl-5-androsten-16β-ol acetate

To a solution of 800 mg. of 3β-ethoxy-16α-methyl-5-androsten-16β-ol in 40 ml. of anhydrous chloroform was added a solution of 8 ml. of acetyl chloride in 16 ml. of dimethylaniline. The resulting solution was left at room temperature for 20 hours, then evaporated to remove chloroform and excess acetyl chloride. The residue was partitioned between 600 ml. of ether and 400 ml. of dilute (1:5) hydrochloric acid. The ether extract was washed with water and evaporated. The residue of 3β-ethoxy-16α-methyl-5-androsten-16β-ol acetate was recrystallized from 90% methanol; M.P. 114.5–115° C.

EXAMPLE 18

16α-methyl-3β-methoxyandrostan-16β-ol 1.5 grams of 16α-methyl-3β-methoxy-5-androsten-16β-ol in 75 ml. of 95% ethanol was hydrogenated in the presence of 0.8 gram of 5% palladium on charcoal catalyst at 15 p.s.i.g. for 3 hours at room temperature. The reaction mixture was filtered to remove the catalyst, the filter was washed with 50 ml. of 95% ethanol and the combined filtrate and wash were diluted with 100 ml. of water and evaporated until crystallization began on a steam bath. The mixture on refrigeration at 5° C. deposited crystals of 16α-methyl-3β-methoxyandrostan-16β-ol. These, after recrystallization from 70% methanol, melted at 131–132° C.

When 3β-propoxy-16α-n-amyl-5-androsten-16β-ol is substituted for the 16α-methyl-3β-methoxy-5-androsten-16β-ol in the procedure of this example, there is produced 3β-propoxy-16α-n-amylandrostan-16β-ol.

EXAMPLE 19

3β-methoxy-16α-ethynylandrostan-16β-ol

A solution of 10.0 grams of 3β-methoxy-5-androsten-16-one in 225 ml. of 95% ethanol was hydrogenated in the presence of 2.0 grams of palladium on charcoal catalyst (5% palladium) at about 18 p.s.i.g. for five hours. About 4 grams of activated charcoal was added, the solution was heated and filtered. The filtrate was diluted with 200 ml. of water and distilled until crystallization began at steam temperature. On chilling, crystals of 3β-methoxy-androstan-16β-ol melting at 137.5–138.5° C. were obtained.

200 ml. of a solution of potassium tertiary-butoxide in tertiary-butyl alcohol (0.04 g. of potassium per ml.) was saturated with acetylene for 1 hour at 0° C. Then a solution of 8.2 grams of 3β-methoxyandrostan-16-one in 125 ml. of ethylene glycol dimethyl ether was added. Acetylene was continuously bubbled through the mixture at 0° C. for 12 hours and then for 10 more hours at room temperature. The reaction mixture was then decomposed by slowly adding thereto 600 ml. of ice water and the mixture was then poured into a liter of ice cold saturated sodium chloride solution containing 20 ml. of hydrochloric acid. The organic layer was separated, washed with water and evaporated in vacuo until the steroid began to crystallize. The latter was filtered, washed well with water and dissolved in 333 ml. of n-propyl alcohol. To this solution was added a solution of 10.0 grams of potassium acetate and 8.0 grams of aminoxyacetic acid hemihydrochloride in 133 ml. of water. The mixture was heated to reflux for 2.5 hours, cooled to 0° C. and extracted with 2500 ml. of ether. The ether extract was washed with 0.4 N sodium hydroxide solution and with water and evaporated, leaving a residue of steroid in n-propyl alcohol. The latter was diluted with ice water and the precipitated steroid was collected on a filter, washed with water and dried. The 3β-methoxy-16α-ethynylandrostan-16β-ol so obtained was dissolved in 200 ml. of acetone, evaporated to 100 ml. and the acetone displaced by the addition of 100 ml. of heptane. This procedure was repeated to produce purified 3β-methoxy-16α-ethynylandrostan-16β-ol melting at 194–195° C.

EXAMPLE 20

3β-ethoxy-16α-methylandrostan-16β-ol

A solution of 1.0 gram of 3β-ethoxy-16α-methyl-5-androsten-16β-ol in 75 ml. of 95% ethanol was hydrogenated in the presence of 0.5 gram of 5% palladium on charcoal catalyst for 5 hours at 20 p.s.i.g. The catalyst was removed by filtration and the solution was diluted with 100 ml. of water and evaporated until crystallization began. On refrigeration, crystals of 3β-ethoxy-16α-methylandrostan-16β-al were obtained. After recrystallization from 75% methanol they melted at 100–101.5° C.

EXAMPLE 21

3β-ethoxy-16α-ethylandrostan-16β-ol

A solution of 2.0 grams of 3β-ethoxy-16α-ethyl-5-androsten-16β-ol in 100 ml. of 95% ethanol was hydrogenated in the presence of 0.6 gram of 5% palladium on charcoal catalyst for 4 hours at a pressure of 20 p.s.i.g. The catalyst was removed by filtration and the filtrate was diluted with 100 ml. of water and evaporated until crystallization began. On refrigeration, crystals of 3β-ethoxy-16α-ethylandrostan-16β-ol were obtained which melted at 95.5–96° C. after recrystallization from 85% methanol.

EXAMPLE 22

*3β-ethoxy-16α-ethynylandrostan-16β-ol*

200 ml. of a solution of potassium tertiary-butoxide in tertiary-butyl alcohol (0.04 gram of potassium per ml.) was saturated with acetylene at room temperature for 1.5 hours and then at 0° C. for 1 hour. To the resulting solution of potassium acetylide in tertiary-butyl alcohol maintained at 0–5° C. was added with agitation a solution of 8.0 grams of 3β-ethoxyandrostan-16-one in 100 ml. of ethylene glycol dimethyl ether. Acetylene was bubbled continuously through the reaction mixture at 0–5° C. for 10 hours and then for 12 hours at room temperature. The reaction mixture was decomposed by the addition of 600 ml. of ice water and poured into 4 liters of ice water containing 30 ml. of concentrated hydrochloric acid. The precipitate of 3β-ethoxy-16α-ethynylandrostan-16β-ol was removed by filtration and washed with water. It was then dissolved in 333 ml. of n-propyl alcohol to which was added a solution of 8.0 grams of aminoxyacetic acid hemihydrochloride and 12 grams of anhydrous potassium acetate in 133 ml. of water. The resulting solution was heated at reflux for 2.5 hours and cooled to 0° C. It was extracted with 2.5 liters of ether and the ether was washed with 0.5 N sodium hydroxide solution and with water. Evaporation of the ether left a residue of steroid in n-propyl alcohol which was diluted with about 4 liters of saturated sodium chloride solution to precipitate the steroid. The precipitate of 3β-ethoxy-16α-ethynylandrostan-16β-ol was dissolved in 100 ml. of acetone, treated with activated charcoal, filtered, evaporated to 50 ml. and then the acetone was displaced by the addition of hexane and evaporation of solvent. By repetition of this procedure, there was obtained 3β-ethoxy-16α-ethynylandrostan-16β-ol of M.P. 173–173.5° C. with sintering at 172.5° C.

EXAMPLE 23

*3β-propoxy-16α-methylandrostan-16β-ol*

A solution of 2.5 grams of 3β-propoxy-16α-methyl-5-androsten-16β-ol in 100 ml. of 95% methanol was hydrogenated in the presence of 1.0 gram of 5% palladium on charcoal catalyst at 16 p.s.i.g. for 5 hours. The catalyst was removed by filtration and the filtrate was diluted with 100 ml. of water and evaporated until crystallization began. On chilling, a precipitate of 3β-propoxy-16α-methylandrostan-16β-ol was formed. After recrystallization from 80% methanol, it melted at 112.5–113° C.

EXAMPLE 24

*3β-propoxy-16α-propylandrostan-16β-ol*

A solution of 1.5 grams of 3β-propoxy-16α-n-propyl-5-androsten-16β-ol in 100 ml. of 95% methanol was hydrogenated in the presence of 0.5 gram of 5% palladium on charcoal catalyst at 30 p.s.i.g. for 4 hours. The catalyst was removed by filtration and the ethanol solution was diluted with water and evaporated until crystallization began. After recrystallization from 70% methanol, the 3β-propoxy-16α-propylandrostan-16β-ol had a melting point of 101–102° C. with sintering from 100° C.

EXAMPLE 25

*3β-propoxy-16α-allylandrostan-16β-ol*

An allylmagnesium bromide solution was prepared from 5.7 grams of magnesium turnings, 100 ml. of anhydrous ether and a solution of 20 ml. of allyl bromide in 150 ml. of anhydrous ether. To this solution was added a solution of 2.8 grams of 3β-n-propoxyandrostan-16-one in 250 ml. of anhydrous ether at such a rate as to maintain the temperature at 0–2° C. with external cooling. The mixture was agitated for 2.5 hours and allowed to stand for 15 hours. It was decomposed by the slow addition of 400 ml. of 2.5 N ammonium chloride solution. 700 ml. of ether was added, the mixture was agitated and the ether was removed, washed with ice water and evaporated. The residue of 3β-n-propoxy-16α-allylandrostan-16β-ol was recrystallized from petroleum ether and melted at 83–84° C.

EXAMPLE 26

*3β-ethoxy-16α-methylandrostan-16β-ol acetate*

A solution of 400 mg. of 3β-ethoxy-16α-methyl-5-androsten-16β-ol acetate in 50 ml. of 95% ethanol was hydrogenated in the presence of 100 mg. of 5% palladium on charcoal catalyst for 6 hours. The catalyst was removed by filtration and the alcoholic solution diluted with water and evaporated until crystallization occurred. The 3β-ethoxy-16α-methylandrostan-16β-ol acetate was separated and recrystallized from 80% methanol; M.P. 80–81° C.

Hydrogenation of 3β-methoxy-16α-methyl-5-androsten-16β-ol butyrate by the foregoing procedure results in 3β-methoxy-16α-methylandrostan-16β-ol butyrate.

I claim:
1. 3β-methoxy-16α-allyl-5-androsten-16β-ol.
2. 3β-methoxy-16α-ethynyl-5-androsten-16β-ol.
3. 3β-ethoxy-16α-allyl-5-androsten-16β-ol.
4. 3β-ethoxy-16α-ethynyl-5-androsten-16β-ol.
5. 3β-propoxy-16α-allyl-5-androsten-16β-ol.
6. 3β-allyloxy-16α-methyl-5-androsten-16β-ol.
7. 3β-allyloxy-16α-n-propyl-5-androsten-16β-ol.

No references cited.

LEWIS GOTTS, *Primary Examiner.*

HENRY A. FRENCH, *Assistant Examiner.*